US 6,667,458 B1

(12) United States Patent
Sirat

(10) Patent No.: US 6,667,458 B1
(45) Date of Patent: Dec. 23, 2003

(54) SPOT SIZE AND DISTANCE CHARACTERIZATION FOR A LASER TOOL

(75) Inventor: Gabriel Y. Sirat, Jerusalem (IL)

(73) Assignee: Optimet, Optical Metrology Ltd., Jerusalem (IL)

( * ) Notice: Subject to any disclaimer, the term of this patent is extended or adjusted under 35 U.S.C. 154(b) by 29 days.

(21) Appl. No.: 09/838,536

(22) Filed: Apr. 19, 2001

Related U.S. Application Data

(60) Provisional application No. 60/198,597, filed on Apr. 19, 2000.

(51) Int. Cl.$^7$ ................................................ B23K 26/00
(52) U.S. Cl. .................................................. 219/121.83
(58) Field of Search ..................... 219/121.6, 121.67, 219/121.68, 121.69, 121.63, 121.72, 121.83, 121.85

(56) References Cited

U.S. PATENT DOCUMENTS

| 4,298,784 A | 11/1981 | Schmall ................ 219/124.02 |
| 4,978,841 A | 12/1990 | Barrett et al. ................ 250/548 |
| 5,340,962 A | 8/1994 | Schmidt et al. ........ 219/121.78 |
| 5,453,969 A | * 9/1995 | Psaltis et al. ............... 369/109 |
| 6,423,933 B2 | * 7/2002 | Nicholas et al. ......... 219/121.7 |

FOREIGN PATENT DOCUMENTS

JP      407251286 A  * 10/1995  ............. 219/121.7

* cited by examiner

Primary Examiner—Samuel M. Heinrich
(74) Attorney, Agent, or Firm—Bromberg & Sunstein LLP

(57) ABSTRACT

A system and method for maintaining a specified distance between the focus of a laser tooling beam of a laser machining system and a workpiece. The system includes an optical assembly for focusing the tooling beam substantially onto a spot on the surface of the workpiece and a beam splitter for deflecting light retro-reflected from the workpiece and through the optical assembly. The system also includes a distance-measuring apparatus, such as a conoscope, for receiving the retro-reflected beam and for determining the distance to the spot on the surface of the workpiece relative to a fiducial reference as well as a controller for governing the location of the workpiece relative to the focus of the optical assembly based on the measured distance of the spot.

12 Claims, 2 Drawing Sheets

SPOT SIZE AND DISTANCE CHARACTERIZATION FOR A LASER TOOL

TECHNICAL FIELD

The present invention relates to laser machining, and, in particular, to an apparatus and methods for characterizing the spot size of a laser beam incident upon a workpiece and the distance from the spot to a fiducial reference.

BACKGROUND ART

The size and shape of the spot at which a laser beam impinges upon a workpiece is of paramount importance in laser welding, cutting and related applications. In order to control such machining operations, the distance between the laser focus and the workpiece must be monitored accurately, and tight tolerances must typically be maintained in order for the rated performance of a particular laser to be maintained. More particularly, the position and orientation of a tool head relative to a workpiece must be monitored and controlled in order to carry out programmed instructions for manufacturing operations.

Schmidt (U.S. Pat. No. 5,340,962), which is incorporated herein by reference, describes some of the challenging features of laser cutting and welding processes that give rise to the need for automatic focus control. A constant separation or gap must be maintained between the nozzle tip and the part, even though the shape of the part being cut or welded may not exactly conform to the part program that guides the laser nozzle or other tool over the part. It may be the case that the part is either warped or else retained slightly out of the correct position, or the part may move or flex due to stress relief as it is being cut or welded. If the gap varies appreciably from the specified value, the focal point of the laser beam, located a small distance below the nozzle tip, will not be in the correct location relative to the part and the beam will be "out of focus." When this occurs, unsatisfactory cuts or welds will usually result.

Automatic focus controls, also referred to as AFCs, typically utilize a small linear servo system which moves the lens/nozzle assembly in a direction parallel to the beam and nozzle under the control of a gap sensor which may use either a capacitor, an eddy current sensor, or some combination thereof, which senses the gap between the nozzle and the workpiece and commands the beam positioner to keep the gap constant when the workpiece is not in its expected position relative to the part program. This may be caused by the part's motion while being laser cut or simply that the part is not exactly the same shape as called for in the part program.

Solutions known and practiced in the art for maintaining a constant gap include capacitive sensors (such as taught in the Schmidt patent), triangulation sensors, and the characterization of a probe beam through a dithered focal element (as taught in Barrett et al., U.S. Pat. No. 4,978,841). Capacitive sensors typically provide a measure of displacement between the tip of a copper nozzle and the conductive part undergoing laser machining by employing the capacitance between these two as the frequency determining element of an oscillator. Thus, the frequency of the oscillator is inversely proportional to the capacitance which is itself directly proportional to the gap distance, and the separation of the tip and part is sensed just below the nozzle tip. Other examples of such capacitive techniques include Schmall (U.S. Pat. No. 4,298,784) which measures the capacitance as well as an inductance change as a function of the distance from the workpiece to the tool and the lateral position of the workpiece relative to the tool. Systems, however, that rely upon measurement of capacitance between the tool and the workpiece are not suitable for continuously monitoring the tool to workpiece distance while the tool operates if the tool creates an ionized plume as does a $CO_2$ laser welding system. The plasma surrounding the nozzle tip during operation of the laser essentially shunts or short circuits the capacitance between the nozzle tip and the part so that monitoring the distance is impossible during periods when the beam is in operation.

The automatic laser focus system of Barrett involves directing a probe laser beam successively to three distinct spots on the workpiece, wobbling the beam while scanning the focussing lens in an axial direction, and searching for a maximum in the high frequency components of the light reflected from the workpiece.

Another method known in the art for measuring the gap is that of eddy current sensors. While, ideally, a winding or coil would be desirable in the nozzle itself in order to measure the gap in close proximity to the focal point of the laser beam, a metallic nozzle cannot readily be used in such a system since the nozzle itself would absorb much of the eddy current, rendering the sensor quite insensitive. Furthermore, nonmetallic nozzles often cannot withstand the intense heat of a weld plume.

It is thus desirable to provide a system and method for measuring the spot distance of a workpiece from the focus of a laser during operation of the laser tool and without dithering the focal element of a probe beam.

SUMMARY OF THE INVENTION

In accordance with a preferred embodiment of the present invention, there is provided a method for maintaining a specified distance between the focus of an optical assembly of a laser machining system and a workpiece having a surface disposed at a location relative to the focus of the optical assembly. The method has the steps of:

a. focusing a light output of a light source through the optical assembly substantially onto a spot on the surface of the workpiece;

b. deflecting light of the light source retro-reflected from the workpiece and through the optical assembly onto a distance-measuring apparatus;

c. measuring the distance to the spot on the surface of the workpiece relative to a fiducial reference; and d. governing the location of the workpiece relative to the focus of the optical assembly based on the measured distance of the spot.

In accordance with alternate embodiments of the invention, the light source may be identical to a source of optical power used for at least one of welding and ablating the workpiece, and may have a spectrum substantially identical to the spectrum of the source of optical power used for welding or ablating the workpiece. The distance-measuring apparatus may be a conoscopic conoscopic holography apparatus, an autofocus apparatus, or a Shack-Hartmann wavefront sensor.

BRIEF DESCRIPTION OF THE DRAWINGS

The foregoing features of the invention will be more readily understood by reference to the following detailed description taken with the accompanying drawings, in which.

DETAILED DESCRIPTION OF SPECIFIC EMBODIMENTS

Figure 1:
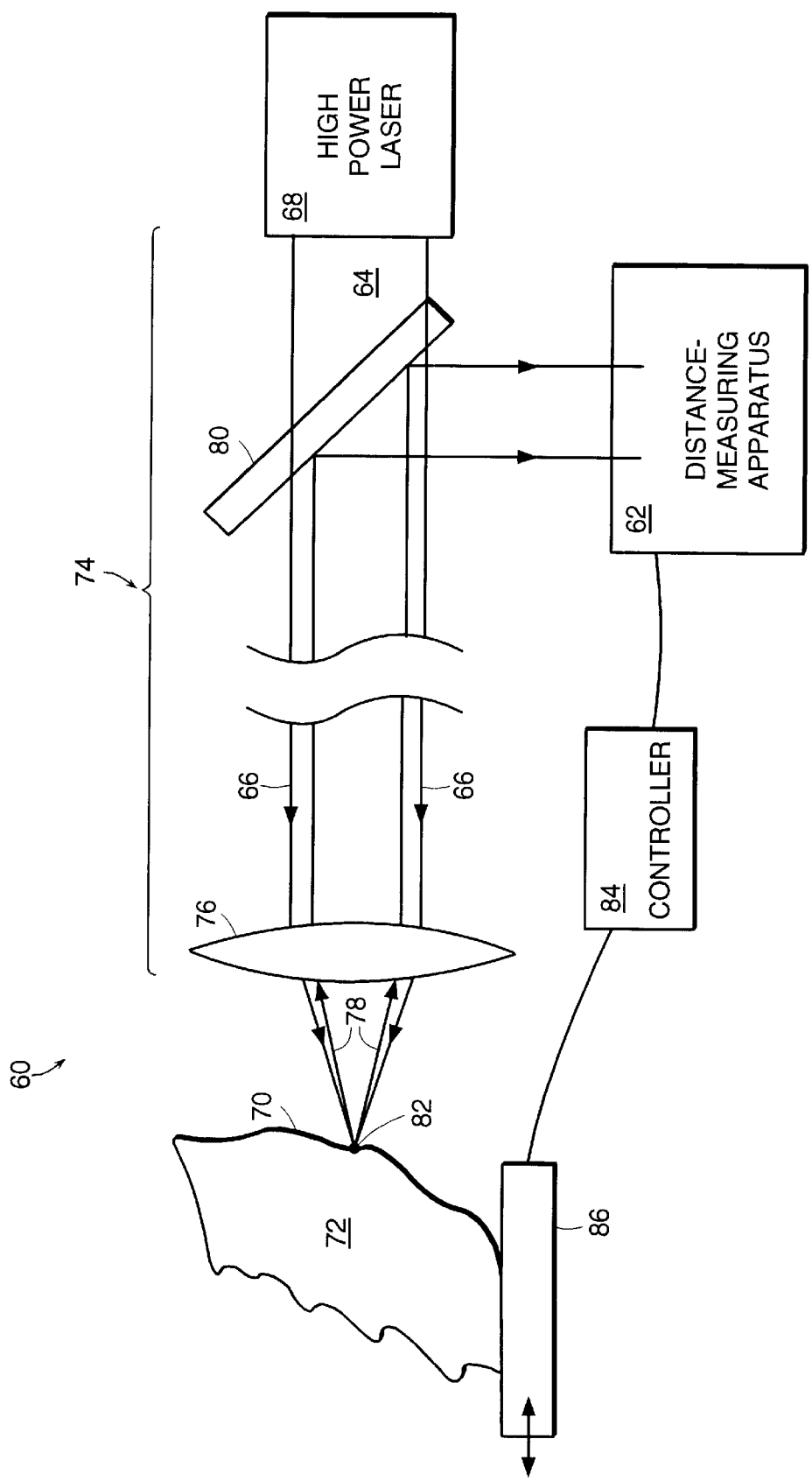
FIG. 1 is a diagram of an optical layout of a spot characterization system employing a distance-measuring apparatus in accordance with certain preferred embodiments of the invention.

A preferred embodiment of the invention is now described with reference to FIG. 1 wherein a diagram shows the optical layout of a spot characterization system, designated generally by numeral 60, where the spot characterization system employs a distance-measuring apparatus 62 in accordance with certain preferred embodiments of the invention. A tooling beam 64, designated by its extremal rays 66, is provided by a high-power laser source 68 which may be, for example, a CO2 laser operating in the infrared or an excimer laser operating in the ultraviolet. Tooling beam 64 is brought to a near-focus at surface 70 of workpiece 72 by optical assembly 74, which may include, as a particular example, objective lens 76. Tooling beam 64 is shown in FIG. 1 as essentially collimated over what may be a significant distance between laser source 68 and objective lens 76.

The light of beam 64, upon reflection (specular or diffuse) from surface 70, is designated by extremal rays 78, shown, without loss of generality, as interior to extremal rays 66 of the incident beam. Return beam 78 is substantially re-collimated by the same optical assembly 74 as used to transfer the original high-power beam to the surface of the workpiece 72. Thus, return beam 78 may advantageously also be transferred over the same long distance as the incident beam. Return beam 78 is deflected by beam splitter 80 into distance-measuring apparatus 62. In accordance with a preferred embodiment of the invention, distance-measuring apparatus 62 is a conoscopic holography system, such as described, for example, in Sirat et al., U.S. Pat. No. 4,976,504, which is incorporated herein by reference. Various means are known to prevent any significant power loss in incident beam 64 due to the presence of beam splitter 80. For example, beam splitter 80 may be polarized in the sense of polarization of beam 64 itself. Thus, beam 64 passes unfettered through the beam splitter en route to the workpiece. That component of reflected beam 78 that is cross-polarized is then deflected by beam splitter 80 into distance-measuring apparatus 62. Other geometrical and optical methods are known in the art whereby any substantial vignetting of the incident beam may be obviated, and use of such methods are within the scope of the present invention and of any appended claims.

Figure 2:
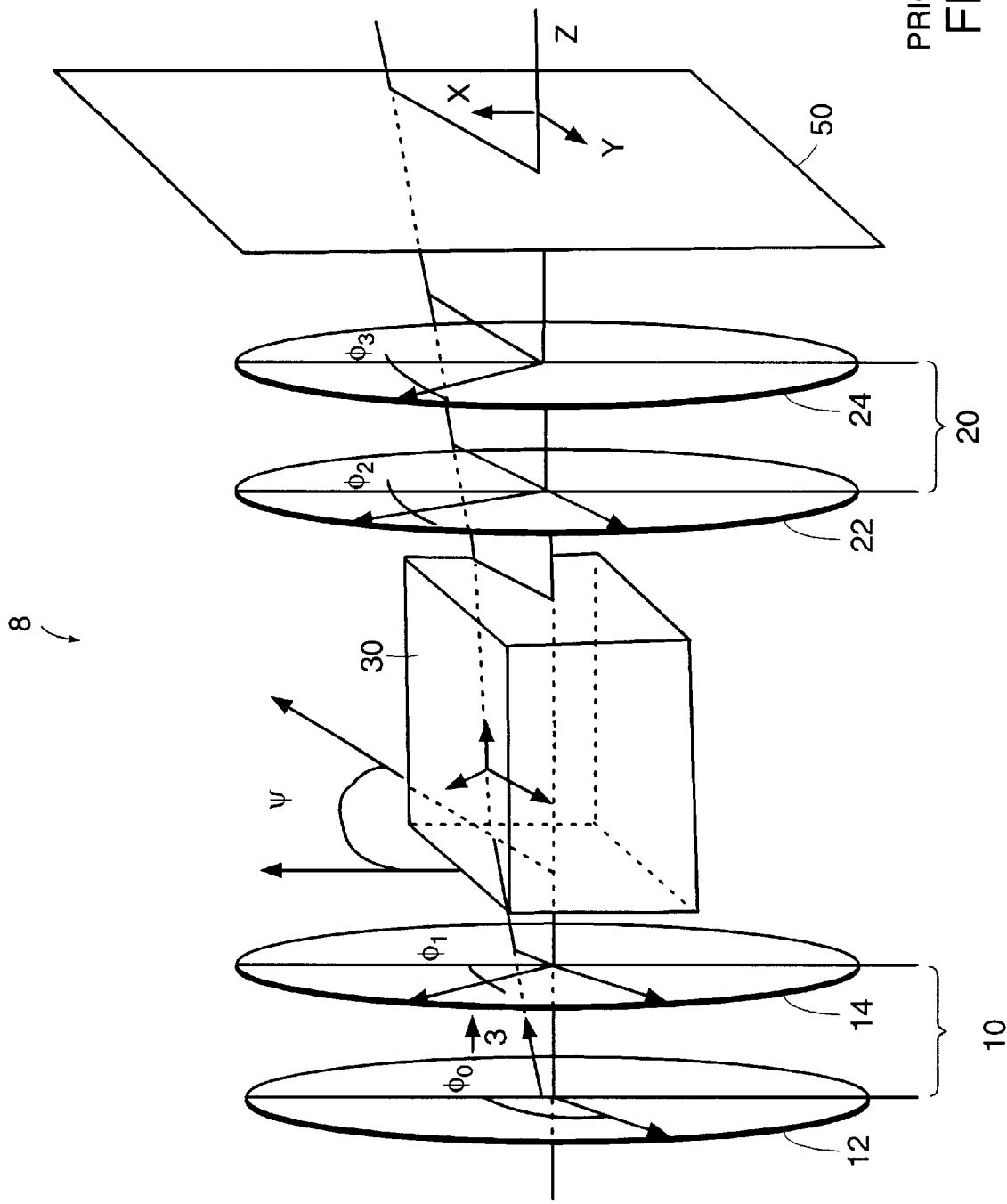
FIG. 2 is a prior art conoscope, as described in U.S. Pat. No. 4,976,504 to Sirat et al., for measuring a distance to one or more points on a surface in conjunction with the spot characterization system of FIG. 1.

Distance-measuring apparatus 62 measures the distance to the apparent source 82 of return beam 78 on surface 70 of workpiece 72 with respect to some fiduciary reference that is known. For example, the known fiduciary reference may be the plane of objective lens 76, or the known focus of objective lens 76, at the wavelength of the tool beam. One distance-measuring apparatus 62 is the conoscopic holography apparatus 8 shown in FIG. 2 and described fully in the Sirat patent incorporated by reference above. In conoscopic holography apparatus 8, a birefringent crystal 30 is interposed between two circular polarizers 10 and 20, each comprised of a linear polarizer 12, 24 and a quarterwave plate 14, 24. Crystal 30 decomposes an incident ray of light 78 reflected from workpiece 72 into an ordinary ray and an extraordinary ray, where the extraordinary ray is subjected to a refractive index that varies as a function of the angle of incidence of the ray. Since the component polarizations propagate at different velocities through crystal 30, they emerge at different phases, with the difference a function of angle of incidence. The two rays interfere in holographic image plane 50, which contains a detector array. The holographic image obtained may be used to reconstruct a three dimensional image of spot 82 of illumination of workpiece 72 by the incident beam. Alternatively, lenslet arrays may be employed for Shack Hartmann wavefront analysis of the illuminated spot. As a further alternative, autofocus methods may be employed, as known in the art.

In accordance with an alternate embodiment of the invention, a source of illumination separate from high power laser source 64 but sharing an optical path through optical assembly 74 may be used for purposes of characterizing spot 82 and sharing many of the attendant advantages of the present invention as discussed above. The wavelength spectrum of the tooling beam may or may not coincide with that of the measurement probe beam with which it is co-aligned.

Referring again to FIG. 1, the output of distance-measuring apparatus 62 may be used, in turn, by controller 84 to govern the position of workpiece 72 with respect to optical assembly 74. The relative position may be modified, for example, by variation in the position of stage 86 on which workpiece 72 is held, or, alternatively, through adjustments made within optical assembly 74.

The described embodiments of the inventions are intended to be merely exemplary and numerous variations and modifications will be apparent to those skilled in the art. All such variations and modifications are intended to be within the scope of the present invention as defined in the appended claims.

What is claimed is:

1. A method for maintaining a specified distance between the focus of an optical assembly of a laser machining system having a tooling beam and a workpiece having a surface disposed at a location relative to the focus of the optical assembly, the method comprising:
   a. focusing a light output of a light source co-aligned with the tooling beam through the optical assembly substantially onto a single spot on the surface of the workpiece, the light source being characterized by a spectrum;
   b. deflecting light of the light source retro-reflected from the workpiece and through the optical assembly onto a distance-measuring apparatus;
   c. measuring the distance to the spot on the surface of the workpiece relative to a fiducial reference; and
   d. governing the location of the workpiece relative to the focus of the optical assembly based on the measured distance of the spot.

2. A method according to claim 1, wherein the step of focusing the light output of a light source includes focusing the light output of a light source that is identical to a source of optical power used for at least one of welding and ablating the workpiece.

3. A method according to claim 1, wherein the step of focusing the light output of a light source includes focusing the light output of a light source characterized by a spectrum substantially identical to the spectrum of the source of optical power used for welding or ablating the workpiece.

4. A method according to claim 1, wherein the step of measuring the distance to the spot on the surface of the workpiece includes measuring the distance with a conoscopic holography apparatus.

5. A method according to claim 1, wherein the step of measuring the distance to the spot on the surface of the workpiece includes measuring the distance with an autofocus apparatus.

6. A method according to claim 1, wherein the step of measuring the distance to the spot on the surface of the workpiece includes measuring the distance with a Shack-Hartmann wavefront sensor.

7. A system for maintaining a specified distance between the focus of a laser tooling beam of a laser machining system and a workpiece having a surface disposed at a location relative to the focus of the tooling beam, the system comprising:

a. an optical assembly for focusing the output of a light source co-aligned with the tooling beam substantially onto a spot on the surface of the workpiece;

b. a beam splitter for deflecting light retro-reflected from the workpiece and through the optical assembly;

c. a distance-measuring apparatus for receiving the retro-reflected beam and for determining the distance to the spot on the surface of the workpiece relative to a fiducial reference; and d. a controller for governing the location of the workpiece relative to the focus of the optical assembly based on the measured distance of the spot.

8. A system according to claim 7, wherein the distance-measuring apparatus is a conoscopic holography apparatus.

9. A system according to claim 7, wherein the distance-measuring apparatus is an autofocus apparatus.

10. A system according to claim 7, wherein the distance-measuring apparatus is a Shack-Hartmann wavefront sensor.

11. A system according to claim 7, wherein the light source is identical to a source of optical power used for at least one of welding and ablating the workpiece.

12. A system according to claim 7, wherein the spectrum of the light source is substantially identical to the spectrum of the source of optical power used for welding or ablating the workpiece.

* * * * *